April 12, 1938.  W. R. FREEMAN  2,113,915

BRAKE CONTROL MECHANISM

Filed Dec. 28, 1936

INVENTOR
WALTER R. FREEMAN
BY
ATTORNEY

Patented Apr. 12, 1938

2,113,915

UNITED STATES PATENT OFFICE 2,113,915

BRAKE CONTROL MECHANISM

Walter R. Freeman, University, Mo., assignor to Wagner Electric Corporation, St. Louis, Mo., a corporation of Delaware Application December 28, 1936, Serial No. 117,702

11 Claims. (Cl. 192—4)

My invention relates to braking mechanism and more particularly to improved control means for preventing release of the brakes from applied position.

In motor vehicles which have their braking systems provided with clutch-controlled brake release preventing means to hold the vehicle from rolling backward on an inclined roadway there may be circumstances wherein some difficulty may be encountered when it is desired to have the vehicle move backwardly down an incline. These difficulties arise because the disengaged condition of the clutch so controls the release preventing means of the brake that the brakes cannot be alternately applied and released in the same manner as if the braking system did not employ any release preventing means.

Therefore, one of the objects of my invention is to overcome the difficulties of this phase of vehicle operation and I accomplish this by associating with the means for preventing release of the brakes from applied position a means for causing said release preventing means to be inoperable when the change speed gearing is placed in reverse gear position.

A more specific object is to associate with a vehicle brake holding means of the type which is governed by the action of gravity and the action of inertia during deceleration of a vehicle and which is also under the control of the clutch mechanism, a control means for causing the holding means to be inoperable only when the shifting mechanism of the change speed gearing is in reverse gear position.

Figure 1:
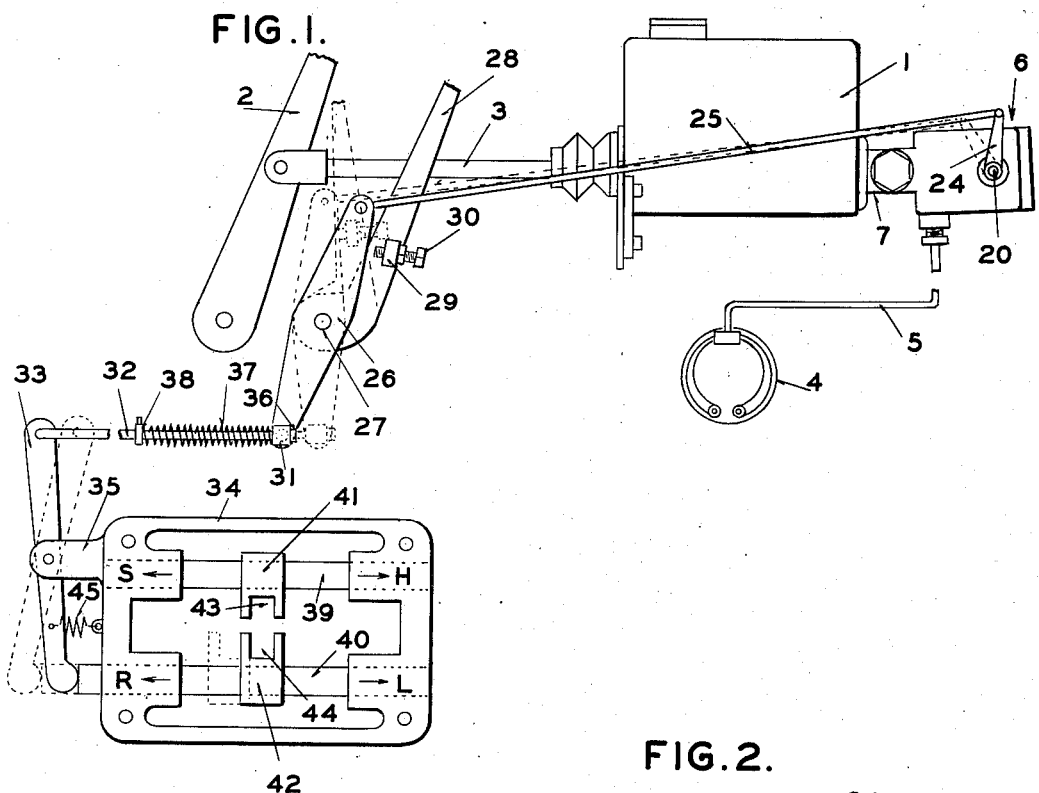
Figure 2:
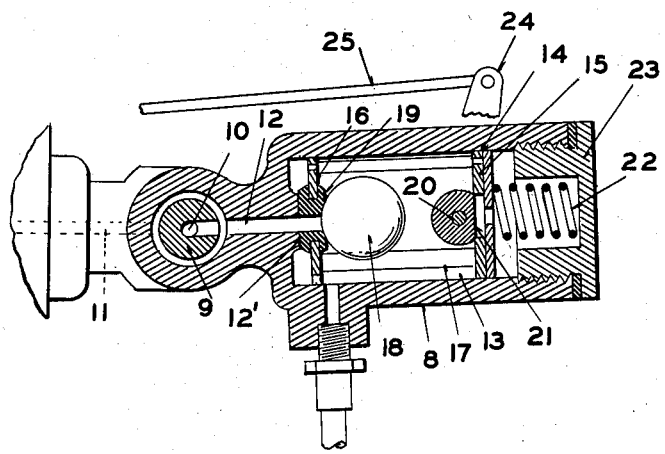

Other objects will become apparent from the following description taken in connection with the accompanying drawing in which Figure 1 is a schematic view of portions of a braking system, a clutch mechanism, and a change speed gearing showing my invention associated therewith; and Figure 2 is a cross-sectional view of the brake release preventing valve.

I have disclosed my invention as being embodied in a hydraulic brake actuating system but it is by way of example only as it can be embodied in other types of brake actuating apparatus if desired.

Referring to the drawing in detail, the master cylinder device 1 for the hydraulic system is of the usual type comprising a cylinder and piston (not shown) whereby actuation of the brake pedal 2 and the connecting rod 3 will create a fluid pressure in the system to apply the brakes. The outlet of the master cylinder is in communication with the wheel brakes 4 (one only being diagrammatically illustrated) by means of the fluid conducting line 5. Interposed between the master cylinder device 1 and conducting line 5 is a clutch-controlled release preventing means 6 whereby the brakes may be held in applied position under certain conditions. The specific release preventing means shown comprises a valve substantially the same as that disclosed in Figure 6 of my Patent No. 2,030,288, issued February 11, 1936, although other types of release preventing means may be employed.

The outlet of the master cylinder device 1 has screw-threaded therein a plug 7 and to this plug is secured the casing 8 of the valve, the securing means comprising a bolt 9 having a passage 10 therethrough which places the passage 11 of the plug in communication with the passage 12 entering casing 8. The chamber 13 in casing 8 is of cylindrical formation and reciprocably mounted therein is a cage 14 comprising end plates 15 and 16 connected together by suitable rods 17, the lower two of which are adapted to form a track upon which is mounted a rolling ball 18. The end plate 16 is formed with a central opening in which is mounted an annular rubber seat 19, one side of which engages the surface 12' surrounding the end of passage 12 and the other side of which is adapted to be engaged by ball 18. The casing 8 is preferably so mounted that the track upon which the ball rolls is slightly inclined as indicated. A rotatable cross shaft 20 extends across the chamber 13 and is formed with a cam surface 21 for cooperation with end plate 15 of the cage, thus providing means for moving the cage longitudinally to the right. The cage is normally biased by a spring 22 to a position wherein the seat 19 is in engagement with the surface 12' surrounding the end of passage 12, this spring being interposed between end plate 15 and the closure plug 23 of the casing. The shaft 20 extends to the exterior of the casing and secured thereto is an arm 24 whereby shaft 20 may be rotated to control the cage.

In accordance with my invention, I control this actuating arm by both the pedal of the clutch mechanism and the shifting mechanism of the change speed gearing of the vehicle. A connecting rod 25 extends from arm 24 and connects it with a lever 26 pivotally mounted at its center upon the clutch shaft 27 that has secured thereto the clutch pedal 28 for actuating the clutch (not shown). The pedal 28 carries a lug 29 having an adjustable bolt 30 thereon whereby the clutch pedal may rotate the lever 26 in a counterclockwise direction in the event the lever is in a position wherein it can be engaged and rotated. The lower arm of lever 26 carries a pivoted block 31 and slidable in an opening therein is a rod 32 connected to a lever 33 pivoted on the change speed gearing housing 34 by a suitable support 35. The rod 32 is formed with a head 36 at the end adjacent lever 26 and this head is normally biased into engagement with block 31 by a spring 37 interposed between block 31 and a collar 38 on the rod.

The portion of the shifting mechanism of the change speed gearing which I have shown comprises a pair of rods 39 and 40 slidably mounted in the upper part of housing 34. The rod 39 carries a shifting fork 41 for controlling the second and high speeds of the gearing by a movement of the rod in opposite directions as indicated by the letters "S" and "H". The rod 40 carries a shifting fork 42 for controlling the reverse and low speeds of the gearing by a movement of the rod in opposite directions as indicated by the letters "R" and "L". The shifting forks are provided with suitable notches 43 and 44 for receiving the usual gear shift lever (not shown) for performing the shifting of the forks. The rod 40 for the reverse and low speed gears is of such length as to extend to the exterior of the casing and engage lever 33 pivoted on the casing. A suitable spring 45 biases lever 33 against the end of this rod.

Referring to the operation of the structure, when the clutch pedal 28 is in its normally engaged position, as indicated by the dashed lines, lever 26 will also be in the position shown by the dashed lines, thus resulting in shaft 20 being in such a position that the cage will be held at the right-hand end of the chamber wherein rubber seat 19 is disengaged from surface 12'. Under these conditions the brakes may be applied and released at will by proper manipulation of brake pedal 2 as the release preventing valve is ineffective.

In the event the vehicle is moving along a highway and the clutch is disengaged by depressing the clutch pedal, lever 26 will follow up the movement of the clutch pedal due to the action of spring 45 and the parts of the mechanism will assume the position as shown in full lines in Figure 1. Under these conditions the cage will be held in a position wherein seat 19 engages surface 12'. The brakes may be applied and released at will since ball 18 will be held off seat 19 due to the action of inertia caused by deceleration of the vehicle.

In the event the vehicle is brought to a stop on an ascending grade with the clutch pedal depressed, the action of gravity will cause ball 18 to roll to the left and close the opening in seat 19. The brakes, if they are now applied or if they have been applied, will be held in applied position since fluid cannot flow back to the master cylinder device from the brakes. It will not be necessary then to hold the foot upon the brake pedal, and the operator is free to employ this foot to operate other instruments as, for example, the accelerator pedal. The brakes will be automatically released when the clutch is engaged since the adjustable stop 30 will engage lever 26 and by means of connecting rod 25 and arm 24 will rotate shaft 20 to move the cage to the right, thus unseating seat 19. The adjustment is such that the cage will be moved substantially simultaneously with the clutch engagement.

The operation of the mechanism just described will be present when the change speed gearing is in either neutral, low, second, or high speed ratio positions since, under these conditions, the position of shifting rods 39 and 40 will have no effect upon lever 33. However, if the gearing is placed in reverse speed position by a movement of the rod 40 to the left, as indicated by the arrow and letter "R", the rod will rotate lever 33 in a clockwise direction and compress spring 37 without moving lever 26 in the event the brakes are in applied position and the clutch pedal is in depressed position since spring 37 is not strong enough to move the cage against the fluid pressure in the brake lines. When the clutch is now engaged to start the vehicle backward, the clutch pedal will engage and rotate lever 26 and by means of rod 25 rotate shaft 20 and move the cage to the right, thereby moving seat 19 off surface 12' surrounding the end of passage 12. In the event the clutch pedal is not depressed when the gearing is placed in reverse position, rod 40 will hold levers 33 and 26 in their normal positions (dashed lines) so that lever 26 cannot follow the clutch pedal when it is depressed. The release preventing means is thus completely inoperative during movement of the vehicle backward down an incline and there is no tendency to hold the brakes applied if the clutch pedal is again placed in disengaged position. This causing of the release preventing means to be ineffective permits the operator to control the vehicle in the same manner as if there were no release preventing means employed in the braking system. As soon as the gear shift lever is operated to place the change speed gearing in either neutral, low, second, or high, the release preventing means will again come under the control of the clutch pedal in the event ball 18 is positioned against seat 19 so that the clutch pedal may control the release preventing means.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a vehicle provided with fluid pressure brake actuating mechanism, a clutch mechanism and a change speed gearing, valve means comprising a rolling ball for preventing release of the brakes from applied position when the vehicle is facing upward on an ascending grade, a connection between the clutch mechanism and the valve means to cause said valve to be open when the clutch is engaged and permitting said valve to be closed when the clutch is disengaged, and means operative when the change speed gearing is in reverse speed ratio position to cause said valve means to be held in open position notwithstanding the disengaging of the clutch.

2. In a vehicle provided with fluid pressure brake actuating mechanism and a change speed gearing, valve means comprising a rolling ball for preventing release of the brakes from applied position when the vehicle is facing upward on an ascending grade, and means operative when the change speed gearing is in reverse gear position to cause said valve means to be held in open position.

3. In a motor vehicle provided with a fluid braking system and a change speed gearing, valve means for preventing release of the brakes from applied position, said means comprising a ball adapted to be moved to valve closed position by the action of gravity and to valve open position by the action of inertia during deceleration of the vehicle, and means operative when the change speed gearing is in reverse gear position to positively hold the ball in valve open position.

4. In a motor vehicle provided with a fluid braking system, a clutch mechanism and a change speed gearing, valve means for preventing release of the brakes from applied position, said means comprising a ball adapted to be moved to valve closed position by the action of gravity and to valve open position by the action of inertia during deceleration of the vehicle, means operable by the clutch mechanism when in disengaged position for permitting the ball to move to valve closed position and when in engaged position causing the ball to be held in valve open position, and means operative when the change speed gearing is in reverse gear position to positively hold the ball in valve open position notwithstanding the disengaged position of the clutch mechanism.

5. In a motor vehicle provided with a braking system, a clutch mechanism and a change speed gearing, means for preventing release of the brakes from applied position, said means comprising a movable ball which is adapted to be moved by the action of gravity to a position to cause said release preventing means to be operable and which is adapted to be moved under the influence of inertia during deceleration of the vehicle to a position to cause said release preventing means to be inoperable, means operable by the clutch mechanism when in disengaged position for permitting the ball to move to a position to cause the release preventing means to be operable, and means operative when the change speed gearing is in reverse gear position to positively hold the ball in a position to cause said release preventing means to be inoperable.

6. In a vehicle provided with a braking mechanism, a clutch mechanism and a change speed gearing, gravity-controlled means for preventing release of the braking mechanism from applied condition, said gravity-controlled means being inoperable under the influence of deceleration of the vehicle, means operable by the clutch mechanism when in disengaged position for permitting the release preventing means to be operable and when in engaged position causing the release preventing means to be inoperable, and means operative when the change speed gearing is in reverse position to cause said release preventing means to be inoperable notwithstanding the action of gravity thereon or the condition of the clutch means.

7. In a vehicle provided with a braking mechanism, a clutch mechanism and a change speed gearing, means for preventing release of the brakes from applied position, means operable by the clutch mechanism when in disengaged position for permitting the release preventing means to be operable and when in engaged position causing the release preventing means to be inoperable, and means operative when the change speed gearing is in reverse speed ratio position to cause said release preventing means to be inoperative notwithstanding the clutch mechanism is disengaged.

8. In a vehicle provided with a braking mechanism, a clutch mechanism including a clutch pedal and a change speed gearing, means for preventing release of the brakes from applied position, a pivoted lever connected to the release preventing means and adapted to be held by the clutch pedal in a position wherein the release preventing means is inoperative when the clutch mechanism is engaged, spring-actuated means for moving the lever with the clutch pedal during its clutch disengaging movement to cause the release preventing means to be operable, and means operative when the change speed gearing is in reverse speed ratio position for preventing said spring-actuated means from moving the lever to a position wherein the release preventing means is operable when the clutch pedal is moved to clutch disengaged position.

9. In a motor vehicle provided with a fluid braking system, a clutch mechanism including a clutch pedal and a change speed gearing, valve means for preventing release of the brakes from applied position, said means comprising a ball adapted to be moved to valve closed position by the action of gravity and to valve open position by the action of inertia during deceleration of the vehicle, a pivoted lever associated with the clutch pedal and connected to control the ball, said lever being held by the clutch pedal in a position wherein the ball is in valve open position when the clutch mechanism is engaged, spring-actuated means for moving the lever with the clutch pedal during its clutch disengaging movement to permit the ball to assume a valve closed position, and means operative when the change speed gearing is in reverse speed ratio position for preventing said spring means from moving the lever to a position wherein the ball is permitted to assume valve closed position when the clutch pedal is moved to clutch disengaged position.

10. In a vehicle provided with a braking mechanism and a change speed gearing, gravity-controlled means for preventing release of the braking mechanism from applied position, said gravity-controlled means being inoperable under the influence of deceleration of the vehicle, and means operative when the change speed gearing is in reverse gear position to cause said release preventing means to be inoperable notwithstanding the action of gravity thereon.

11. In a vehicle provided with a braking mechanism, a change speed gearing and means whereby power may be caused to be applied to the vehicle wheels at the will of the operator, means for preventing release of the brakes from applied position, means operable when power is not being applied to the wheels of the vehicle for permitting the release preventing means to be operable and when power is being applied to the vehicle wheels for causing the release preventing means to be inoperable, and means operative when the change speed gearing is in reverse speed ratio position to cause said release preventing means to be inoperable notwithstanding power is not being applied to the vehicle wheels.

WALTER R. FREEMAN.